(12) United States Patent
Lipton

(10) Patent No.: US 11,541,642 B2
(45) Date of Patent: Jan. 3, 2023

(54) SYSTEM AND METHODS FOR FABRICATING ACTUATORS AND ELECTRICALLY ACTUATED HYDRAULIC SOLID MATERIALS

(71) Applicant: Cornell University, Ithaca, NY (US)

(72) Inventor: Jeffrey Lipton, Medford, MA (US)

(73) Assignee: Cornell University, Ithaca, NY (US)

( * ) Notice: Subject to any disclaimer, the term of this patent is extended or adjusted under 35 U.S.C. 154(b) by 95 days.

(21) Appl. No.: 17/328,916

(22) Filed: May 24, 2021

(65) Prior Publication Data

US 2021/0339511 A1 Nov. 4, 2021

Related U.S. Application Data

(63) Continuation of application No. 15/575,327, filed as application No. PCT/US2016/033080 on May 18, 2016, now abandoned.

(60) Provisional application No. 62/163,156, filed on May 18, 2015.

(51) Int. Cl.
*F03G 7/06* (2006.01)
*B32B 27/08* (2006.01)

(52) U.S. Cl.
CPC .............. *B32B 27/08* (2013.01); *F03G 7/06* (2013.01); *Y10T 428/31504* (2015.04)

(58) Field of Classification Search
CPC ............ F03G 7/005; F03G 7/06; F03G 7/065; H01H 37/46; H01H 61/02; B32B 27/08; Y10T 428/31504
See application file for complete search history.

(56) References Cited

U.S. PATENT DOCUMENTS

| 5,720,169 A | * | 2/1998 | Schneider | ................. F03G 7/06 60/528 |
| 2016/0251558 A1 | * | 9/2016 | Eliyahu | .................... C08L 23/06 252/74 |

* cited by examiner

*Primary Examiner* — Michael B Nelson
(74) *Attorney, Agent, or Firm* — Valauskas Corder LLC

(57) ABSTRACT

With applications such as soft robotics being severely hindered by the lack of strong soft actuators, the invention provides a new soft-actuator material—Electrically Actuated Hydraulic Solid (EAHS) material—with a stress-density that outperforms any known electrically-actuatable material. One type of actuator is fabricated by making a closed cell that acts as highly paralyzed version of a standard paraffin actuator. Each cell exhibits microscopic expansion, which is summed to produce macroscopic motion. The closed cellular nature of the material allows the system to be cut and punctured and still operate. It can be produced in a lab or industrial scale, and can be formed using molding, 3D printing or cutting.

14 Claims, 9 Drawing Sheets

| Actuator Type | Voltage range [V] | Typical Force [N] | Maximum Stress [MPa] | Maximum Strain % | Density [$\frac{kg}{m^3}$] | Specific Actuation [$\frac{MPa}{\frac{kg}{m^3}}$] |
|---|---|---|---|---|---|---|
| Hydraulic Solids | $1 \times 10^0$ - $3 \times 10^2$ | $2.1 \times 10^3$ - $4.5 \times 10^3$ | $1.3 \times 10^1$ - $2.9 \times 10^1$ | 1.0 - 4.2 | $9.7 \times 10^2$ | $3.0 \times 10^{-2}$ |
| Dielectric Actuators | $5.5 \times 10^3$ - $1.8 \times 10^4$ | $5.0 \times 10^0$ - $2.9 \times 10^1$ | $1.3 \times 10^{-2}$ - $1.2 \times 10^0$ | 2.9 - 220 | $1.0 \times 10^3$ | $1.20 \times 10^{-3}$ |
| IPMC | $1 \times 10^0$ - $6.0 \times 10^0$ | $2.0 \times 10^{-3}$ - $1.6 \times 10^2$ | $4 \times 10^0$ - $1.0 \times 10^1$ | 6.0 - 50 | $2.0 \times 10^3$ | $5 \times 10^{-3}$ |
| Piezoelectric | $2 \times 10^1$ - $2.5 \times 10^2$ | $5 \times 10^1$ - $8.5 \times 10^3$ | $1.0 \times 10^{-3}$ - $2.0 \times 10^1$ | $5.0 \times 10^{-4}$ - $8.7 \times 10^{-2}$ | $7.80 \times 10^3$ | $2.6 \times 10^{-3}$ |
| SMA | $1 \times 10^0$ - $3.6 \times 10^1$ | $8.9 \times 10^2$ - $4 \times 10^0$ | $7.0 \times 10^1$ - $1.8 \times 10^2$ | $2.0 \times 10^{-1}$ - 9.0 | $6.4 \times 10^3$ | $2.8 \times 10^{-2}$ |
| Twisted Nylon | NA | $1.0 \times 10^1$ - $5.0 \times 10^2$ | $1 \times 10^0$ - $7.5 \times 10^0$ | 20 - 49 | $1.2 \times 10^3$ | $6.5 \times 10^{-3}$ |

FIG. 13

SYSTEM AND METHODS FOR FABRICATING ACTUATORS AND ELECTRICALLY ACTUATED HYDRAULIC SOLID MATERIALS

This application is a continuation of U.S. application Ser. No. 15/575,327 filed Nov. 17, 2017, which is a national application of PCT/US2016/033080 filed May 18, 2016, which claims the benefit of U.S. Provisional Application No. 62/163,156 filed May 18, 2015, incorporated by reference in its entirety.

FIELD OF THE INVENTION

The invention relates generally to actuators. More specifically, the invention is directed to a system and methods for fabricating actuators including wax actuators, for robotics and automation applications. In addition, the invention is directed to a new material including a conductive material component for use in the fabrication of actuators.

BACKGROUND OF THE INVENTION

Electrically driven polymeric actuators are an important basis for modern microfluidics, soft electronics, and soft robotics, and considered one of the bottlenecks of many applications for robotic and automation. Each one of the existing actuator technologies available today involves a difficult tradeoff between performance metrics. For example, dielectric actuators allow for high frequency responses and high strains, but are unable to generate large forces. Piezoelectric materials require high voltage and produce very small strains. Shape memory alloys require high currents or small cross sections to increase resistance. Swelling polymer gels can be compliant and generate large volumetric changes by absorption compounds from the environment, which limits applicability. While each has found their niche in the Pareto front of actuators, none can generate very high quasi-static loads, have a high stress density and be driven by low voltages. In fact, very few material actuators can generate more than one hundred Newtons of force in a typical engineering or lab environment.

These actuators such as a Dielectric Actuators (DEA) or an Ionic Polymer Metal Composite (IPMC) allow for high frequency responses and high strains but are unable to generate large forces. These actuators often allow for planar expansion at a constant volume, or generate a strain differential causing a bending action. Neither is able to generate a volumetric expansion. Swelling polymer gels, which can be compliant and generate large volumetric changes, rely on absorption or emission of compounds from the environment. In order for soft actuators to find further use in robotics and automation, a soft actuator may need to generate very high quasi-static loads and be driven by low voltages and currents.

The production of actuatable materials is an important area of development for Solid Freeform Fabrication (SFF). Traditionally manufactured actuators have a diverse set of power sources and applications. These range from hydraulic and pneumatic systems used in heavy equipment, to electric motors and piezoelectric systems used for small scale manipulations. Each actuator type is generally dependent upon the needs of a particular application. For a 3D printed actuator to be deemed useful, it must be able to compete with its similar non-printed actuators.

Although Solid Freeform Fabrication (SFF) has been used for printing with wax materials for many years, SFF has had limited success in building actuator systems. Ionic Polymer Metal Composites (IPMCs) actuators are generally used in a research context and show promise as artificial muscles and microfluidic valves. They often need to have high reliability, fast response times, and low creep.

Attempts to produce complete electromechanical motors using electrostatics and electromagnetic designs have relied on printing the plastic components and manually adding wires and conductors. These are considered some of the current best efforts, but not a true 3D printed motor since the vast majority of the complexity and materials in their designs are still produced by hand. However, they have allowed people to rapidly prototype a design which could be later optimized for manufacture.

The most successful electrically powered 3D printed actuators are human muscle cells. While these have no industrial counterpart, they have been integrated into 3D printed constructs to make devices which respond to electrical stimuli. Such design may use added geometric complexity enabled through 3D printing to help the cells receive nutrients in the device while operating.

There have been successful types of 3D printed actuators—piezoelectric and pneumatic. Piezoelectric materials are often used for their high speed movements, small displacements and accurate displacements. These materials have been successfully fabricated using SFF techniques through both direct and indirect methods. 3D printed pneumatics have been produced using SLS systems and integrated into other complex assemblies. These actuators have had a high level of reliability and durability. The ability to 3D print pneumatic actuators allows for the integration of many support components—fluid lines, mounting brackets, etc.—to be integrated into a single printed part.

Wax actuators are used in a limited set of applications. In general they are used for high reliability short stroke and high power density applications. Often they are used as part of a temperature regulation system in greenhouses, appliances, HVAC and automotive applications. These actuators can rely on ambient heat or heat generated by electrical resistance to actuate. Traditional wax actuators convert thermal energy to mechanical energy as a wax substance within the actuator expands due to increasing temperature. Generally, such wax actuators are comprised of a chamber and elastomeric membrane for containment of the wax, a piston for concentrating the displacement, and a resistive heating source. Specifically, a wax actuator traditionally uses a single chamber of wax in a metal enclosure which is attached to a membrane or piston. When the wax melts, it expands causing the piston to move of the membrane to inflate. Cooling the wax causes it to contract and return to the original configuration. The melt profile of the wax can be customized to allow for sharp transitions at specific temperatures, or spread out over a range of temperature to allow for positional control between its contracted and expanded state.

While 3D printed actuators have been an area of active development, only weak polymer actuators, small displacement piezoelectric actuators, and pneumatic actuators have been produced with 3D printing. Thus, there is a need for soft electrical actuators capable of generating higher forces and stresses than previously achieved. In addition, there is a need for a new material to facilitate fabricating these soft electrical actuators including using 3D printing techniques. The invention satisfies these needs.

SUMMARY OF THE INVENTION

The invention is directed to actuators including wax actuators, for robotics and automation applications. In addition, the invention is directed to a new material including a conductive material component for use in actuators.

According to one embodiment of the invention, material filled actuators are fabricated. A direct fabrication method uses a multi-step process of producing completely sealed material filled cells. This method produces an actuator similar to the more traditional wax actuator.

According to another embodiment of the invention, actuators are fabricated using an Electrically Actuated Hydraulic Solid (EAHS) material. The EAHS material according to the invention comprises or consists of a polymer matrix including a phase change material and a conductive material, both suspended in the polymer matrix.

According to the invention, the EAHS material may be utilized in many different manufacturing processes, for example, cutting, casting and extruding processes including layer-wise fabrication. In addition, EAHS material may be used with a 3D printing device as described below. 3D printing of actuators has several potential advantages over traditionally manufactured actuators. 3D printing allows for rapid prototyping, allowing a user to iterate through design very quickly. A 3D printable actuator also allows a user to test a design for a new actuator without the costs associated with setting up tooling for a new traditionally manufactured design. 3D printing also offers added geometric complexity over traditional methods. This added geometric complexity may allow for new efficiencies to be achieved. 3D printing can also allow for many diverse material combinations which may allow for complete systems to be produced on a single device.

According to one multi-step process of the invention to produce completely sealed material filled cells, a direct fabrication method is used. First, a portion of a cell is 3D printed such as from a silicone material and allowed to cure. The cell is then filled with a material—wax, paraffin wax, EAHS material—and allowed to cool. Additional material may be added after cooling to fill in the depressions left in the center of the cell, then allowed to cool again. The cooled material forms a core that is removed from the cell and set aside. The cell is then washed or bathed in a solution such as water. It is contemplated that the temperature of the solution is greater than the melting temperature of the material forming the core causing any material that coated the cell walls to melt and float to the surface. The cells are then removed from the solution. The core is placed back into the cell and a top layer of the cell is printed and allowed to cure. According to another embodiment of the invention, a layer-wise fabrication process is contemplated such that the cell and the core are created simultaneously.

According to another embodiment of the invention, the cell including core are fabricated from an Electrically Actuated Hydraulic Solid (EAHS) material. An EAHS material may combine wax with other materials, with the combination 3D printable in the form of an actuator. Electrically actuated hydraulic solid (EAHS) materials are operable at relatively low voltages and currents, allowing for easy integration into many environments where high voltages or currents can be detrimental. The actuators can be formed by casting, additive manufacturing and mechanical operations allowing for the deployment of the actuators in small scale rapid prototyped systems and large scale commercial production.

More specifically, EAHS materials comprise or consist of a network of conductive materials suspended in an elastomeric matrix. The conductive material may be selectively distributed through the polymer matrix. It is also contemplated that the conductive material may be randomly or evenly distributed through the polymer matrix. The conductors transfer energy into cells of thermally expansive materials embedded inside the matrix, thereby causing the entire EAHS material to expand. Rather than design a migration of charge, a chemical reaction, or a realignment of atomic structures, the bulk EAHS material replicates the functionality of different elements of a mechanical design using different functional sub materials. The result is a functional analog that is produced in a massively parallelized fashion.

The invention replicates the functionality and components of a traditional paraffin piston into a scalable material framework. Paraffin motor actuators are well known for their high force stroke and stable actuation, making them ideal for large quasi-static force generation. They operate at easily achievable voltages and currents, and have a slow cycle rate, making them robust against intermittent power disconnections. Paraffin motors have three distinct components: A chamber with an elastomeric membrane for containment of the wax, the wax itself, and a resistive heating source for converting current into thermal energy. Electrically Actuated Hydraulic Solid (EAHS) materials are a bulk material system where the functionality of these distinct components is replaced by the intrinsic behavior if three raw materials. This distributed cellular structure for the actuator makes it significantly more robust than its mono-cellular paraffin actuator counterpart. One advantage is that it can be punctured repeatedly and severed into section and each cell not damaged remains operational.

According to a particular embodiment, a phase change material (PCM) is dispersed in an elastomer matrix. The matrix contains a network of conductive material. This allows the elastomeric matrix to act as a heater and membrane for the phase changing cells. When a voltage is applied, the system heats, the PCM expands generating an internal pressure. This pressure causes the overall structure to expand.

The matrix is formed of a polymer that embeds the PCM and conductive material. The polymer may be a single part or two part elastomeric polymer, for example RTV silicone or two part Polydimethylsiloxane (PDMS).

PCMs include any material with a high heat of fusion (high melting point) and that change volume significantly when undergoing a phase transition by heating and cooling. This can include a liquid-solid change, a solid-liquid change, a solid-gas change and a liquid-gas phase change. Particular examples of PCMs include paraffin wax, fatty acids and water. A PCM should be selected for a high change in volume when undergoing the phase transition. The PCM melting or boiling point, and direction of volume change depend on the particular application. Water has a solid unheated state as an expanded state, with heating causing the structure to weaken and contract. Paraffin waxes can be blended and selected for a particular transition temperature and expand when heated, allowing the structure to generate force when current is applied and the structure is heated.

Conductive material is any material that has the property of conducting electricity and can be embedded in the elastomer matrix to form a network of the material through the elastomer. This includes, for example, powders, strips and fibers of metals, carbon and other materials which are conductive. Particular examples of conductive material include carbon black, silver nanoparticles, and copper filings.

The method for creating EAHS material includes combining the PCM, polymer and conductive material. Any method for combining the PCM, polymer and conductive material is contemplated as dependent upon the form of material used. For example, a powdered PCM solid or melted liquid PCM may be added to a single part elastomer containing the conductive material. As another example, a powdered PCM and conductive material may each be added into a different precursor of a two part elastomer, which are then combined. The powdered PCM and conductor could be added to one part of a two part elastomer and then mixed with the other part. Liquid PCM could be mixed in with one part of two part elastomer and then the other part is mixed with the powered, then both parts are mixed together. Alternatively to mixing, the PCM could be embedded inside of an unset conductive material-elastomer blend. This can be accomplished using a 3D printer, inkjet, or other additive process. The conductive material-elastomer blend is cured after the PCM is embedded to fabricate the EAHS.

Advantageously, EAHS material may be manipulated into any form for cutting, printing, molding, and extruding. According to one method of fabrication of EAHS, a phase change material such as paraffin wax is melted and stirred into a first precursor material forming a first mixture, which is cooled. A conductive material such as carbon black is selected and mixed into a second precursor material forming a second mixture. A precursor is a compound that participates in a chemical reaction that produces another compound. The first and second mixtures are combined and cured to form the EAHS. For example, the EAHS material is a Polydimethylsiloxane (PDMS) elastomer embedded with a paraffin wax matrix and conductive material.

In order to address the challenges of existing actuator technologies, the invention identifies a new kind of bulk material actuator that offers a new performance tradeoff in stress density that is un-dominated by existing technologies. Whereas most compliant electroactive polymers attempt to induce a mechanical change by means of a charge migration, or charge separation, EAHS actuators uses a network of conductive materials suspended inside of an insulating elastomeric matrix to generate thermal energy. This energy is then transferred into cells of thermally expansive materials embedded inside of the matrix. The heated cells expand when they transition from a solid to a liquid as they are heated, generating internal pressure. The elastomer matrix acts as a containment system for the embedded phase change material, preventing the liquid phase from leaching out of the system. Each entrapped paraffin globule acts as an independent "micro-piston" as a result. Motion is bidirectional in that it is expansive on heating and shrinks on cooling. Large forces however are only generated during the expansion phase for a PCM. A PCM with a positive coefficient of thermal expansion from melting expand when heated. A PCM with a negative coefficient of thermal expansion from melting expand when cooled below the freezing point.

The invention and its attributes and advantages may be further understood and appreciated with reference to the detailed description below of one contemplated embodiment, taken in conjunction with the accompanying drawings.

BRIEF DESCRIPTION OF THE DRAWINGS

The preferred embodiments of the invention will be described in conjunction with the appended drawing provided to illustrate and not to the limit the invention, where like designations denote like elements, and in which:

FIG. 13 illustrates a table of various electroactive material actuators compared across important performance metrics.

DETAILED DESCRIPTION OF PREFERRED EMBODIMENTS

According to one embodiment, the invention is directed to an actuator fabricated using Solid Freeform Fabrication (SFF). More specifically, the invention is drawn to direct fabrication methods and new materials for fabrication including 3D fabrication. For exemplary purposes, the invention refers to silicone/wax cell actuators when discussing direct fabrication methods and Electrically Actuated Hydraulic Solid (EAHS) actuators when discussing new materials for fabrication of electrically actuated actuators. Similar to traditional actuators, both are complexly soft, allowing them to be integrated into the growing field of soft robotics. Both types of actuators are completely metal free, allowing them to operate in environments like MRIs, where traditional wax actuators would be unable to operate due to their metal housings and pistons. In addition, the actuators of the invention volumetrically expand, which may prove ideal for certain evolutionary biology work. It is also contemplated that the system and methods of the invention may be useful in applications such as temperature regulation systems for greenhouses, appliances, HVAC and automotive applications, highly reliable short stroke and high power density applications, and rapid prototyping.

According to one embodiment of the invention, a direct fabrication method is used to fabricate completely sealed material filled cells. Specifically, a 3D printed wax actuator is created using a multi-step process as shown by the flow chart in FIG. 1 and block diagram of FIG. 2.

Figure 1:
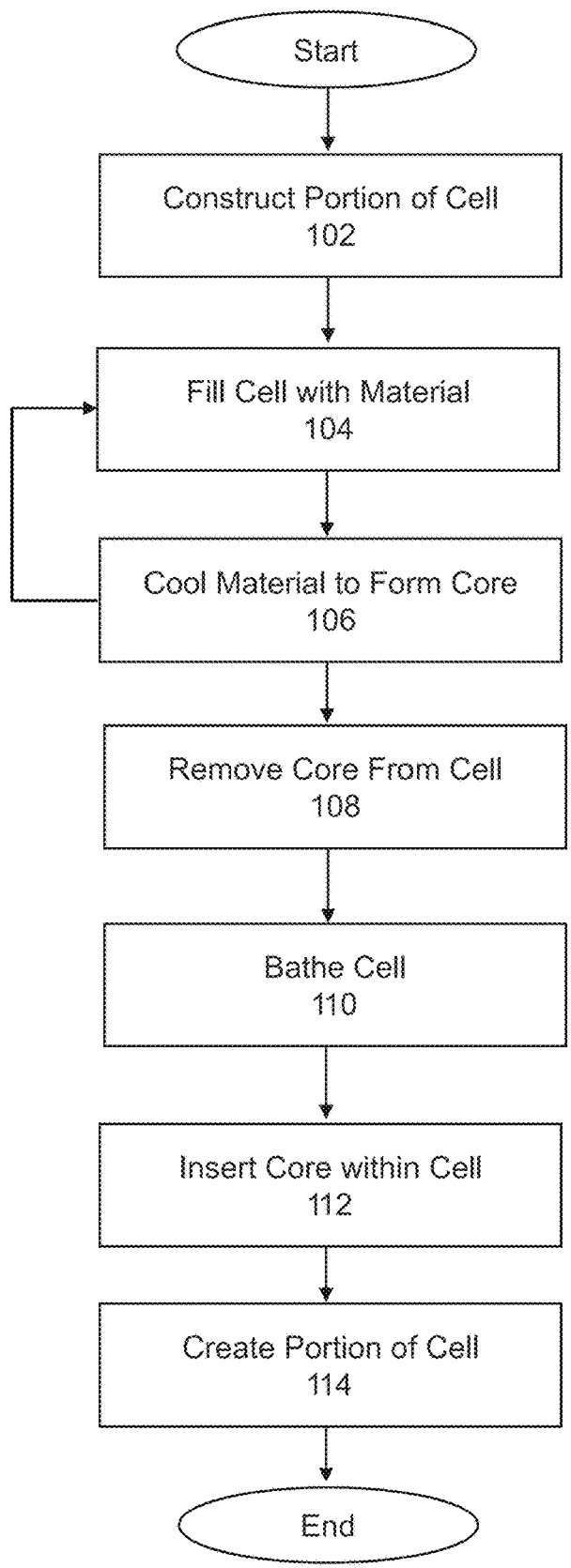
FIG. 1 is a flow chart of a method for fabricating material filled cells of an actuator according to an embodiment of the invention.
Figure 2:
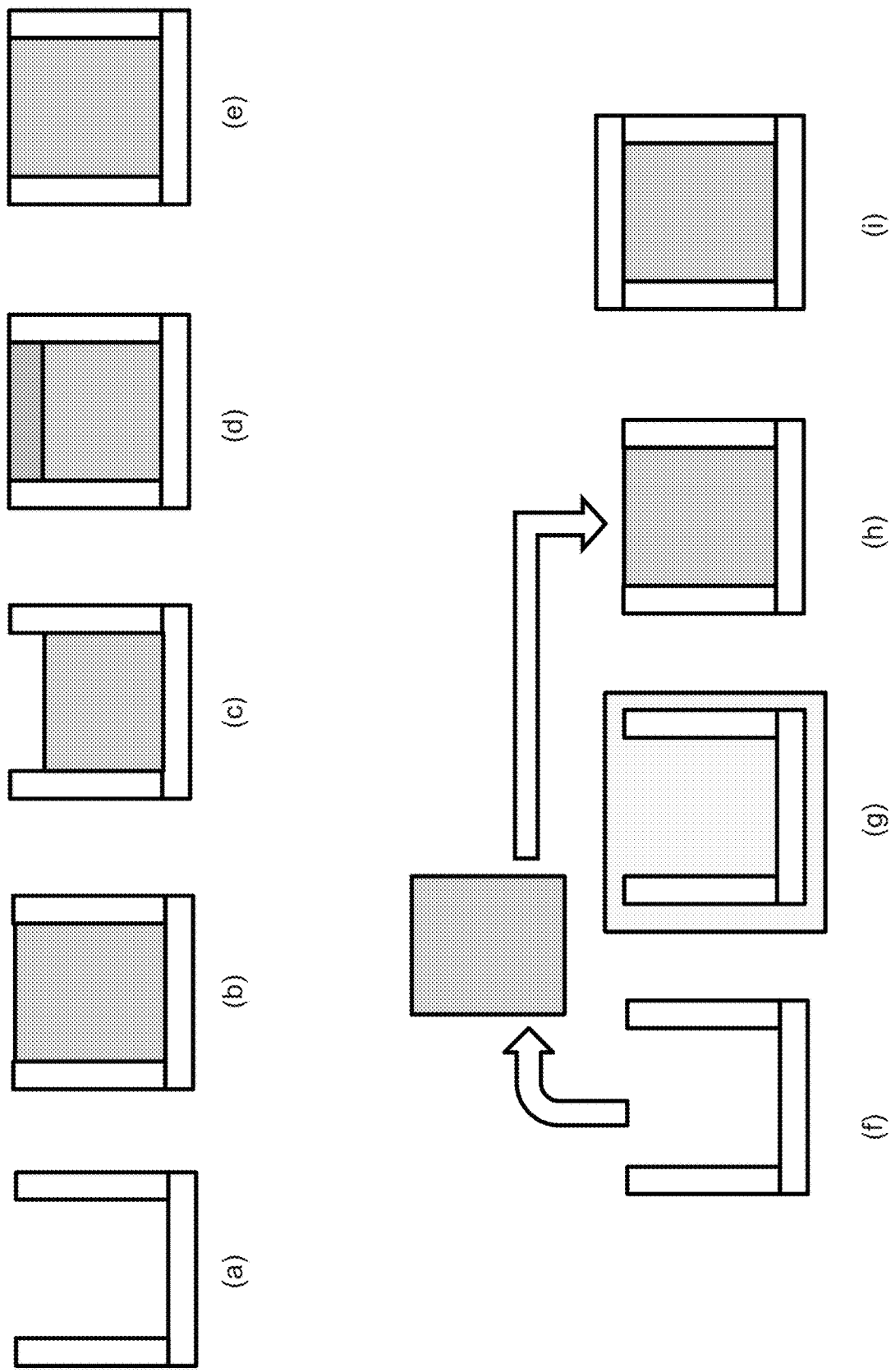
FIG. 2 is a block diagram of the method shown in FIG. 1 for fabricating material filled cells of an actuator according to an embodiment of the invention.

As shown by step 102 of FIGS. 1 and 2(a) of FIG. 2, a portion of a cell is 3D constructed such as by 3D printing device using a Fab@home Model 3 system. The cell is constructed of a silicone material, however any material is contemplated that allows deformation upon heating and cooling. Once constructed, the cell includes a cavity formed by a bottom side connected to a first side, a second side, a third side and a fourth side. The 3D printed cell is allowed to cure, for example overnight or at least 6 or 8 hours. The cavity of the cell is then filled with a material at step 104 of FIGS. 1 and 2(*b*) of FIG. 2. The material is allowed to cool forming a core as show in FIG. 1 at step 106 and 2(*c*) of FIG. 2. According to the invention, the material used may be wax such as paraffin wax or a material with a portion made of wax such as an EAHS material discussed more fully below. After cooling the core may shrink or depression may have formed. Thus, steps 104 and 106 of FIG. 1 may be repeated to add material to fill in any depressions left in the cell, also shown by 2(*d*) and 2(*e*) of FIG. 2. The cooled material forms a core that is removed from the cell and set aside shown by step 108 of FIGS. 1 and 2(*f*) of FIG. 2. At step 110 of FIGS. 1 and 2(*g*) of FIG. 2, the cell is washed or bathed in a solution such as water. As an example, the cell may be bathed in water at a temperature greater than the melting temperature of the material of the core, for example 85 degrees Celsius, causing any material that coated the cell walls to melt and float to the surface. The cell is then removed from the solution.

The core is inserted back into the cell at step 112 of FIGS. 1 and 2(*h*) of FIG. 2. As shown by step 114 of FIGS. 1 and 2(*i*) of FIG. 2, a top layer of the cell is created by using a 3D printing device and allowed to cure, such as overnight, to fabricate a compliant cell structure with the cell encapsulating the core. When the cell is heated or re-heated, it expands and when cooled or re-cooled, it shrinks. The cell finds the lowest energy state for the new internal volume. It should be noted that control of the wall thickness of the cell, i.e., a thin side wall, can direct the expansion into that a direction. As a result, these soft actuators are thermally activated and capable of expanding, for example by up to 6% of volume when heated above the melting temperature of a wax core. Closed wax filled cells produced using the method described above were measured in the X and Y directions at their thickest points and exhibited a 5% to 9% increase dimensional length as a result of heating.

According to another embodiment of the invention, a novel single bulk material actuator is developed using electrically actuated hydraulic solid (EAHS) materials to massively parallelize and simplify this process and convert a rigid traditional wax actuator into an elastic material. The single bulk material actuator replicates the functionality and components of a traditional wax actuator through the integration of conductive elements into the material enabling actuation (i.e., expansion, contraction) of the actuator.

Hydraulic solids can generate higher forces and stresses per unit density, than any previously reported actuator material. EAHS are operable at relatively low voltages and currents, allowing for easy integration into many environments where high voltages or currents can be detrimental. The actuators can be formed by casting, additive manufacturing and mechanical operations allowing for the deployment of the actuators in small scale rapid prototyped systems and large scale commercial production. Their main drawback is actuation speed. Since EAHS are thermally actuated, cycle time depends on shape and insulation, and is approximately one thousand seconds for a centimeter cubed actuator. EAHS actuators use a network of conductive materials suspended inside of an insulating elastomeric matrix to generate thermal energy.

Figure 3:
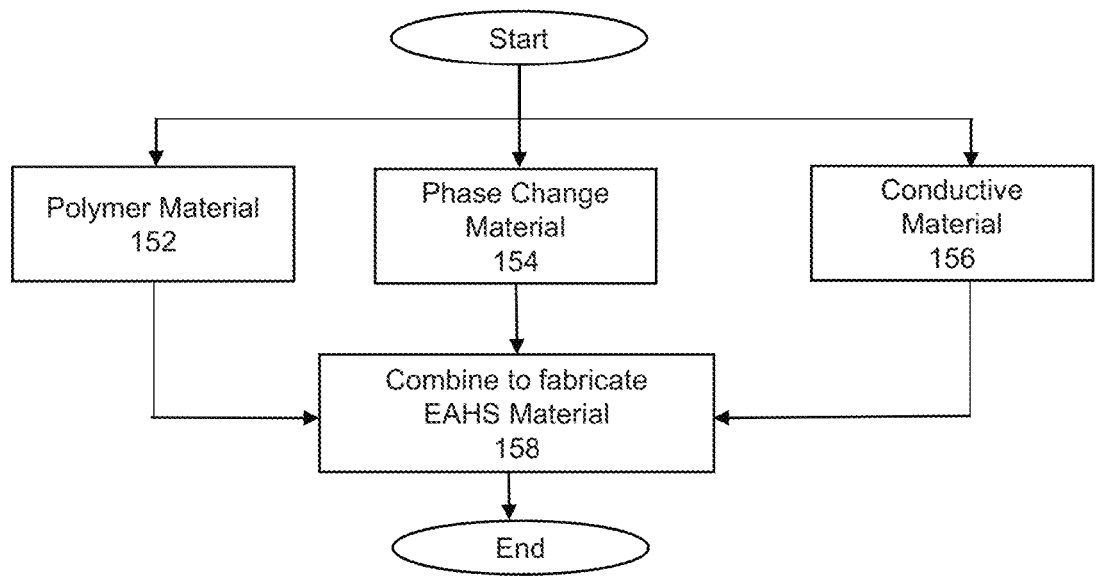
FIG. 3 is a flow chart of a method for fabricating Electrically Actuated Hydraulic Solid (EAHS) material according to an embodiment of the invention.

According to one embodiment, an EAHS material is a two-part Polydimethylsiloxane (PDMS) elastomer, embedded with a paraffin wax matrix and conductive material. As shown in FIG. 3, Electrically Actuated Hydraulic Solid (EAHS) material 158 is fabricated by combining a polymer material 152, a phase change material 154, a conductive material 156. All materials 152, 154, 156 may be combined simultaneously, however any order for combining materials 152, 154, 156 is contemplated. For example, the polymer material 152 and phase change material 154 may be combined prior to combining with the conductive material 156. As another example, the polymer material 152 and conductive material 156 may be combined prior to combining with the phase change material 154. Combining a polymer material 152, a phase change material 154, and a conductive material 156 forms a conductive elastomeric structure.

The polymer may be a single part or two part elastomeric polymer, for example RTV silicone or two part Polydimethylsiloxane (PDMS).

PCMs 154 are those with a high melting point and that change volume significantly when undergoing a phase transition by heating and cooling, i.e., a liquid-solid change, a solid-liquid change, a solid-gas change, a liquid-gas change. Particular examples of PCMs include paraffin wax, fatty acids and water. PCMs may have a positive or negative coefficient of thermal expansion. More specifically, a PCM with a positive coefficient of thermal expansion from melting expand when heated. A PCM with a negative coefficient of thermal expansion from melting expand when cooled below the freezing point.

Conductive material 156 is embedded in the elastomer matrix to form a network of the material through the elastomer and may include powders such as carbon black, strips and fibers of metal such as copper filings, carbon and other conductive materials.

The method for creating EAHS material includes combining the PCM, polymer and conductive material. Any method for combining the PCM, polymer and conductive material is contemplated as dependent upon the form of material used. For example, a powdered PCM solid or melted liquid PCM may be added to a single part elastomer containing the conductive material. As another example, a powdered PCM and conductive material may each be added into a different precursor of a two part elastomer, which are then combined. The powdered PCM and conductor could be added to one part of a two part elastomer and then mixed with the other part. Liquid PCM could be mixed in with one part of two part elastomer and then the other part is mixed with the powered, then both parts are mixed together. Alternatively to mixing, the PCM could be embedded inside of an unset conductive material-elastomer blend, for example using a 3D printing device.

Figure 4:
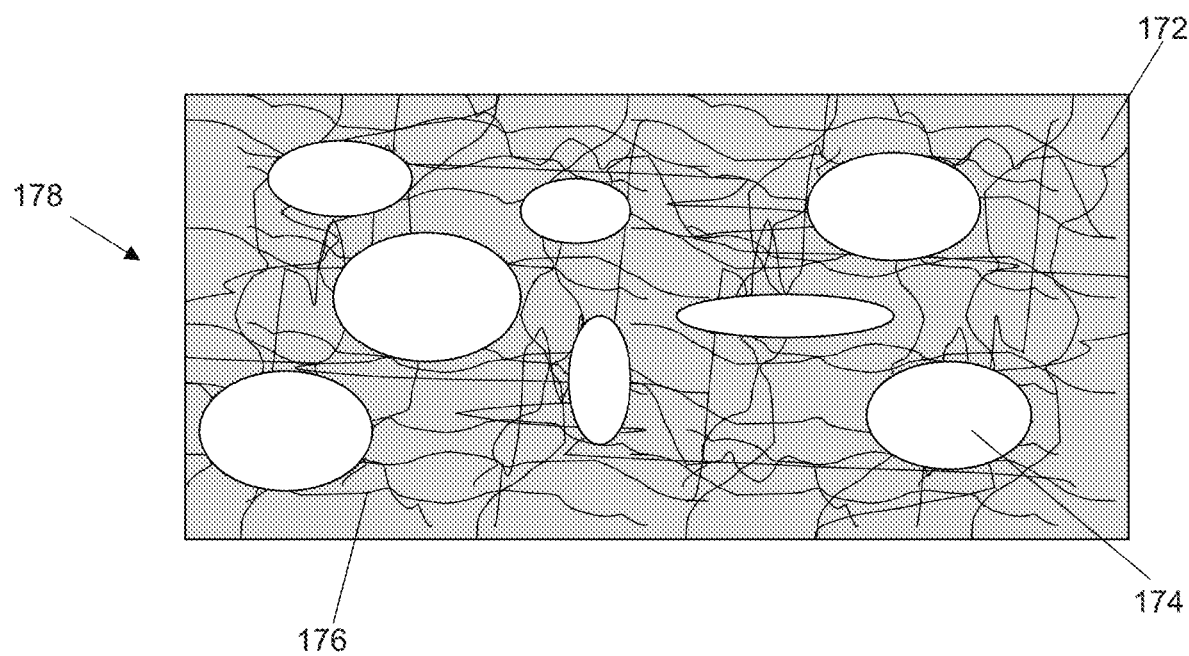
FIG. 4 illustrates a portion of an Electrically Actuated Hydraulic Solid (EAHS) material according to an embodiment of the invention.

A conductive elastomeric structure of an Electrically Actuated Hydraulic Solid (EAHS) material is shown in FIG. 4. As shown in FIG. 4, the structure 178 of an Electrically Actuated Hydraulic Solid (EAHS) material comprises or consists of a polymer matrix 172 including a phase change material 174 and a conductive material 176, both embedded and suspended in the polymer matrix 172. As shown in FIG. 4, the phase change material 174 forms a plurality of closed cells encapsulated by the polymer matrix 172. Although the conductive material 176 is illustrated in FIG. 4 as being randomly distributed through the polymer matrix 172, it is contemplated that the conductive material 176 may be evenly distributed through the polymer matrix 172 or selectively positioned within the matrix.

When the PCM undergoes a phase change as controlled by the conductive material, the internal pressure varies and actuates the structure. The PCM undergoes a phase change to vary internal pressure by either expanding or contracting. For example, PCM in the form of water is heated to contract the EAHS material structure and frozen to expand the EAHS material structure. In contrast, a PCM in the form of a gas may be heated to expand the EAHS material structure and cooled to contract the structure. The PCM can return to its unheated state, for example, by being embedded in an environment at a temperature lower than the temperature required for a phase change of the PCM. This allows the PCM to revert to its cooled state when not heated by the conductive material. It is contemplated that changing the ambient temperature and thermal conduction of the environment can change the rate at which the EAHS structure cools.

Figure 5:
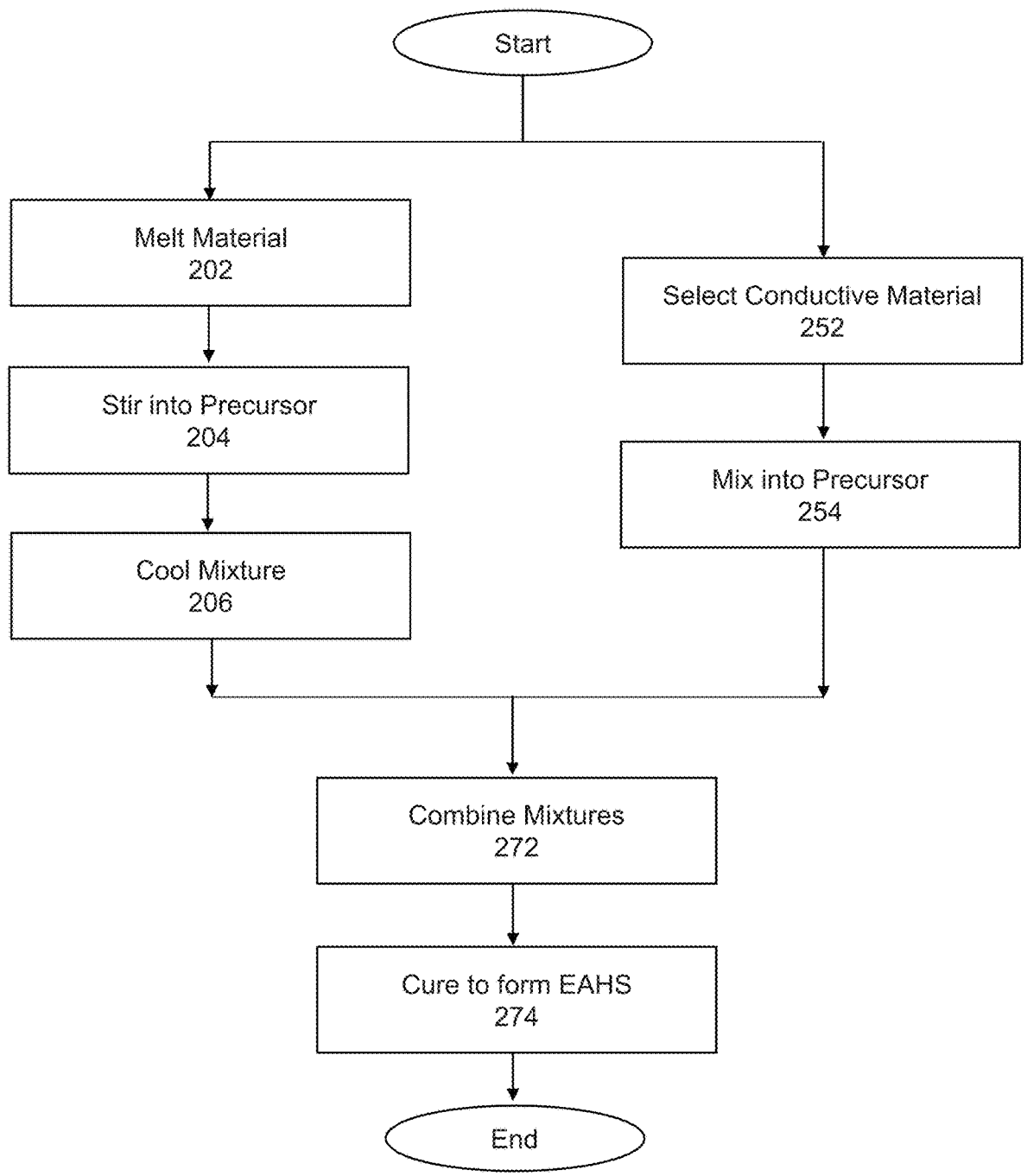
FIG. 5 is a flow chart of a method for fabricating Electrically Actuated Hydraulic Solid (EAHS) material according to another embodiment of the invention.

As shown more specifically in FIG. 5, a phase change material is melted at step 202. According to one embodiment, the phase change material may be paraffin wax. The paraffin wax has a melting temperature of 60 degrees Celsius. The liquid paraffin wax is rapidly stirred into a precursor at step 204. Precursors according to the invention may be a silicone elastomer matric, Polydimethylsiloxane (PDMS). A ratio of the phase change material to the first precursor material achieves a desired internal pressure. At step 206, the mixture of phase change material and first precursor material is cooled and allowed to cure. The material phase separates entrapping the wax structures inside the PDMS. These structures are generated by the turbulent mixing and phase separation, randomly distributing them through the material.

As shown by step 252, a conductive material is selected such as carbon black. The conductive material is mixed with a second precursor at step 254. At step 272 both mixtures are combined. When both sets of doped precursor are combined together the material starts to cure and the EAHS is formed as shown by step 274. It should be noted that material without carbon black or a conducting matrix displays the same expansion properties, but requires an external heat source. According to this embodiment, applying a voltage to the combined mixture causing the phase change material to expand or contract.

As an alternative to the method described above, a two part Polydimethylsiloxane (PDMS) of Ecoflex 0050 by Smooth-On are mixed together at room temperature. After the Ecoflex are mixed, it is placed in an open metal container and liquid paraffin wax is gently added to the metal container so as to prevent material from leaving the container. The PDMS and liquid wax are then mechanically mixed rapidly. The wax cooled as a result of the thermal energy transfer from the wax to the PDMS. The wax is not allowed to pool or stagnate in the container as the entire volume of PDMS and wax is mixed. Mixing is stopped once the entirety of the wax is cooled to room temperature. The mixture of wax and PDMS is then optionally placed in a vacuum chamber to de-gas the mixture. The PDMS compound has a pot life of 18 minute, cures in 3 hours, and must cure at temperatures above 18 degrees Celsius. After printing the parts must be allowed to sit to fully cure.

Figure 6:
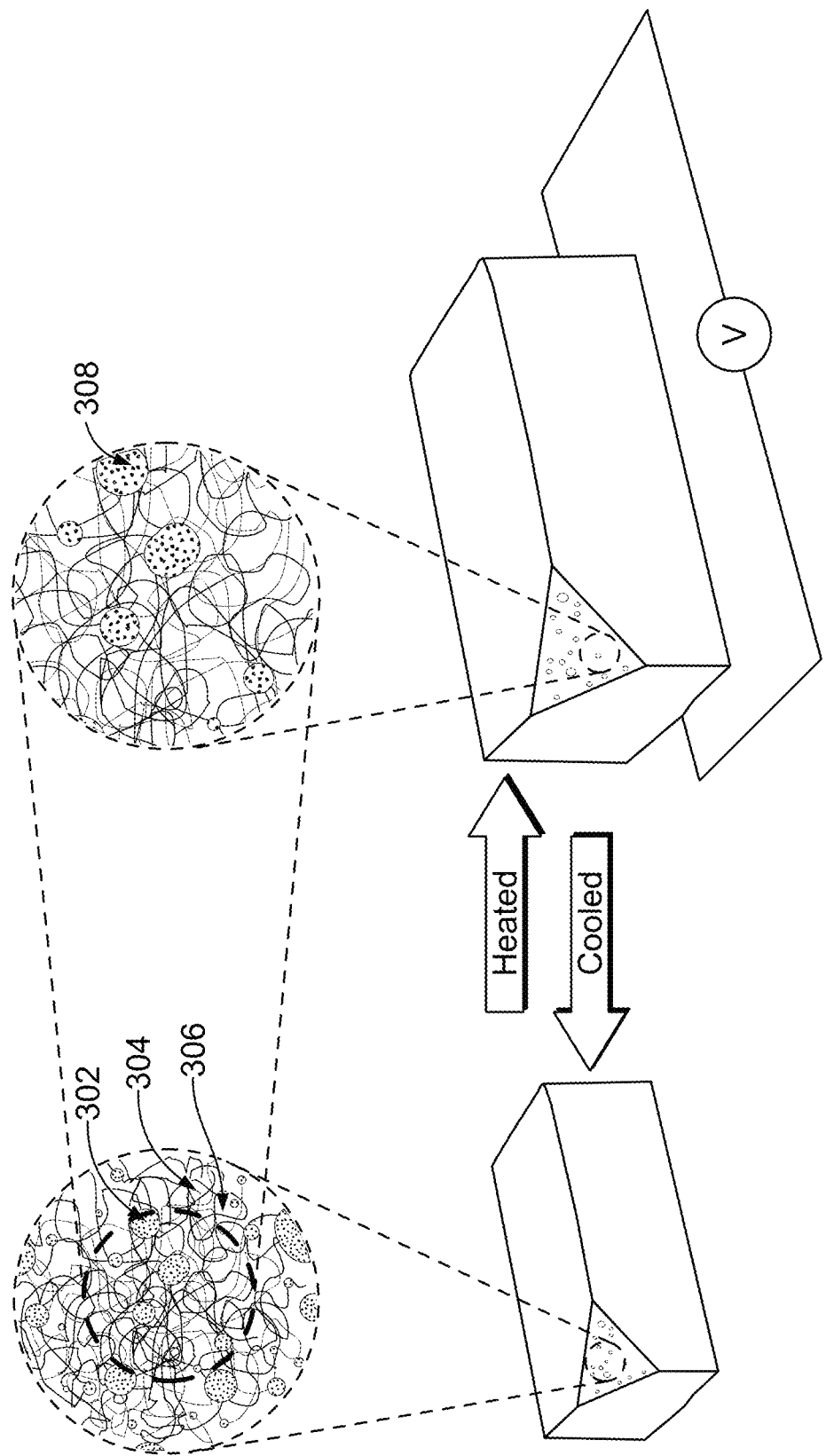
FIG. 6 is a block diagram of fabricated EAHS material according to an embodiment of the invention.

FIG. 6 is a block diagram of fabricated EAHS material according to an embodiment of the invention. As shown in FIG. 6, the material includes a phase change material such as solid wax particles 302, a conductive material such as carbon black particles 304, and a precursor material such as PDMS 306. Heating the material causes the phase change particles to transform from solid particles 302 to liquid particles 308. Cooling these particles 308 causes them to transform back into solid particles. With the material transformations of EAHS, it may be formed by cutting, printing, molding, and extruding. For example, EAHS material may be placed into a 3D printing device based on syringe deposition, using the Fab@Home Model 3 platform. The material could be extruded through an 18-gauge taper plastic tip form Nordson EFD during its pot-life. Smaller tips lead to jamming of the head from the particles of wax. The material was self-supporting and bonded across layers. As an alternative to 3D printing, the material could also be placed into rigid mold and cast into a variety of shapes. Alternatively, a piece of the cured material can be cut or carved into shapes using a blade. Voltage 310 as applied to the EAHS material controls the conductive material. Thus, patterning of placing electrodes into the material for the current delivery allows for the control the effective resistance of the material. Inserting the electrodes as a set of interwoven wisps or strands allows for minimal resistance and selective actuation of the material. The insulating nature of the elastomer matrix slows the rate of thermal conduction between sections with current flow and sections which are dormant.

Figure 7:
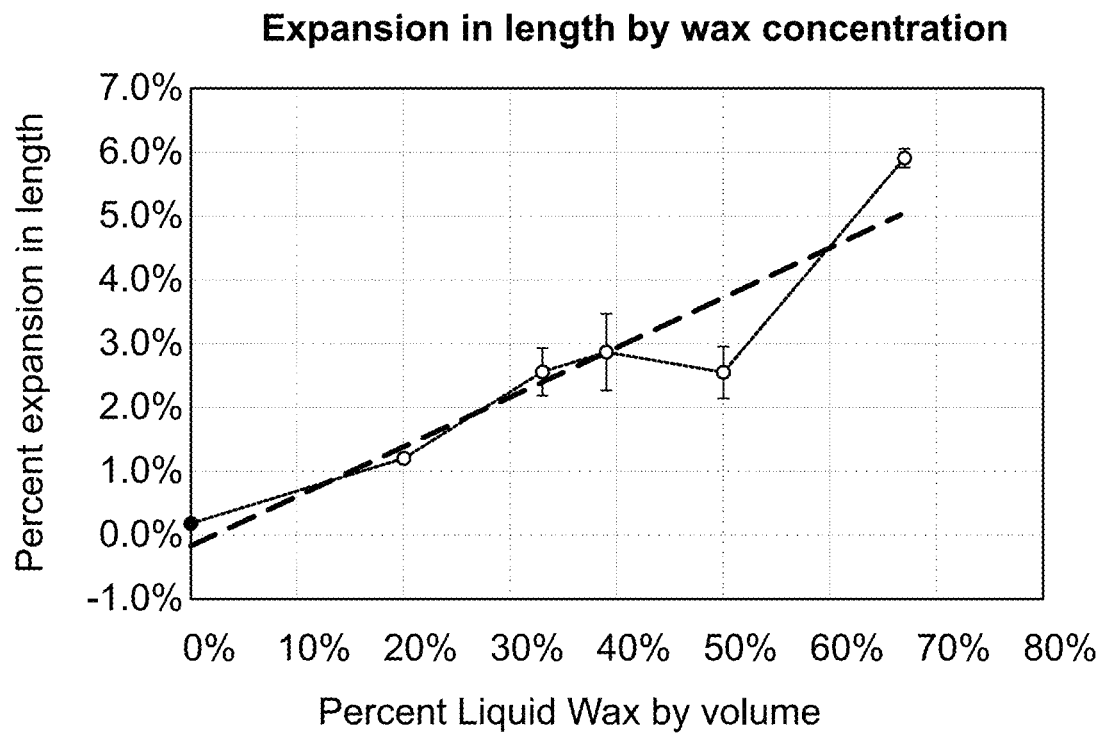
FIG. 7 is a graph illustrating expansion in length by wax concentration according to an embodiment of the invention.

As mentioned above, by varying the relative ratio of the elastomeric matrix to the phase change material, the internal pressure generated for a specified temperature can be controlled. In order to characterize the effects of the wax to PDMS concentration, several different ratios of wax to PDMS by liquid volume were produced and tested. In order to test the thermal expansion of the material, molds were out of ABS on an FDM system. The molds were 10 mm wide, 10 mm tall, and 45 mm long. The PDMS-wax mixture was placed in the mold and allowed to cure. The molded PDMS-wax mixture was removed once cured and placed in a bath of water at 85 degrees Celsius, above the melting temperature of the wax. Once all of the wax was melted, it was removed from the liquid and measured in the longest direction using calipers with an accuracy of 0.01 mm. As shown by FIG. 7, increasing the percentage wax in the material increases the amount the material expands when heated. There is an unexpected decrease in the percentage of expansion between 40% and 50% of wax by volume. Lower internal pressure results in a smaller expansion and lower forces generated for the same thermal condition. Successful EAHS were fabricated with concentrations of phase change material between 0 and 60% of the bulk material by volume. When the concentration of phase change material exceeded 60%, the matrix becomes too sparse to encapsulate the cells, causing leakage between pistons that resulted in loss of pressure.

As shown in FIG. 7, concentrations of 0%, 20%, 33% 39% 50% and 66% by liquid wax of the material were made and tested. The material showed a definite increase in length relative to the pure PDMS sample. Since PDMS has a relatively high coefficient of thermal expansion of $3.10*10^{-4}$ percent-$C^{-1}$ it is expected that the PDMS will increase in size when heated from room temperature to 85 degrees Celsius. Since the ambient temperature was not recorded, it is not possible to compare the results with the value expected in literature accurately. However an estimate of 21 Celsius for room temperature would give a 1.92% increase in length when heated to 85 degrees Celsius and a 1.7% increase was measured. The trend in the data shows that as the concentration of wax is increased, the material expands more.

Additionally, a purely linear actuator is demonstrated by confining a cylinder of the material inside of a rigid tube with a cap on the end. Since the internal pressure from the phase change material will expand in any direction, containing the materials expansion is necessary for generating high forces for linear displacement. A 50 mm long, 14 mm diameter cylindrical sample is heated to 70 degrees C. The blocked force, outward stroke and return stroke were measured using a MTS machine with a laser extensometer. The sample was heated in the blocked position and then the tester would cycle through loading and unloading three times. The system demonstrated a significant but small amount of hysteresis most likely due to internal energy losses from straining the elastic matrix.

Figure 8:
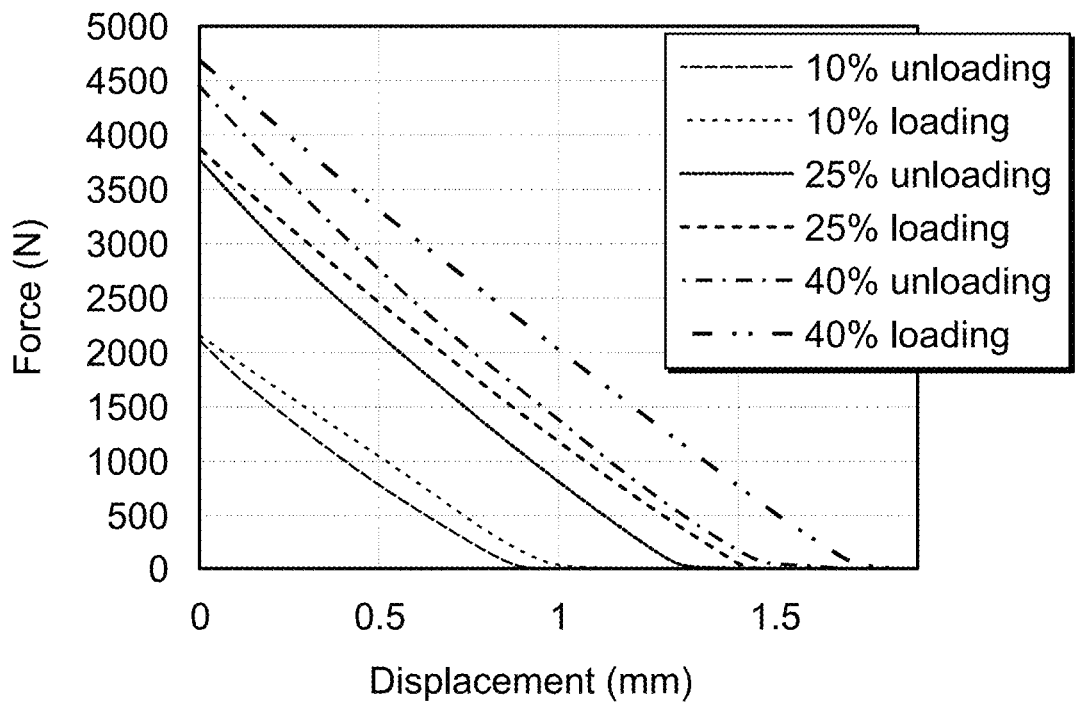
FIG. 8 is a graph illustrating force versus displacement data on the performance of a linear actuator made from EAHS according to an embodiment of the invention.

FIG. 8 is a graph illustrating force versus displacement data on the performance of a linear actuator made from EAHS according to an embodiment of the invention. As shown by FIG. 8, the force generated and strain generated is dependent on the concentration of the phase change material. There is significant hysteresis in the actuation.

Figure 9:
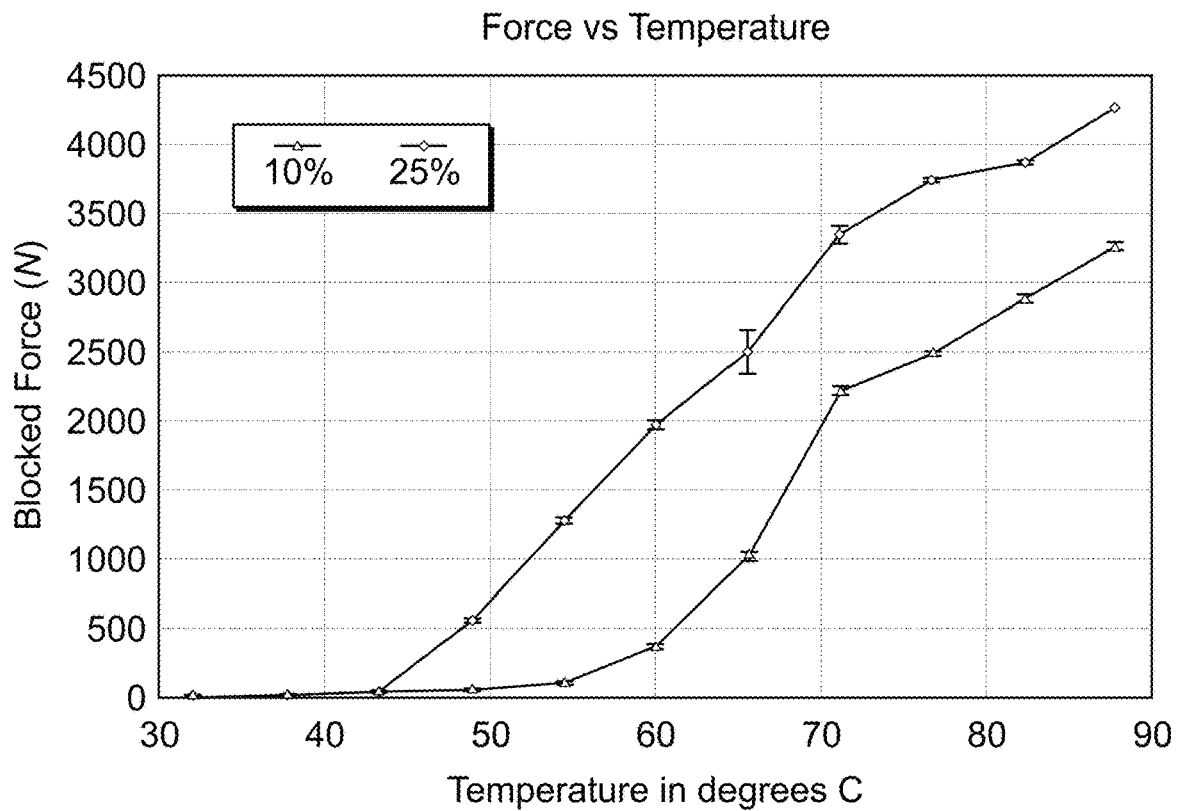
FIG. 9 is a graph illustrating force versus temperature data on the performance of a linear actuator made from EAHS according to an embodiment of the invention.

FIG. 9 is a graph illustrating force versus temperature data on the performance of a linear actuator made from EAHS according to an embodiment of the invention. As shown by FIG. 9, the blocked force is dependent on the temperature of the sample and concentration of phase change material.

This actuator allowed for up to 4.5 kN of force and a displacement on the order of 2 mm from a 50 mm long sample. This is several orders of magnitude (~$10^5$) more force than IPMC bending actuators can generate at their tip for similar voltages and several orders of magnitude (~$10^2$) than DEA actuators can generate at 5 kV. The high force and low density results in a specific actuation $$\left(\frac{\sigma}{\rho}\right) \text{ of } 3.0*10^{-2} \left[\frac{MPa}{\frac{g}{cm^3}}\right].$$

Shape memory alloys have a specific actuation of $$2.8*10^{-2}\left[\frac{MPa}{\frac{g}{cm^3}}\right],$$

twisted polymer fibers have a specific actuation of only $$6.52*10^{-3}\left[\frac{MPa}{\frac{g}{cm^3}}\right]$$

While SMA and twisted fiber actuators generate their forces by compressing, the EAHS actuators generate their forces by expanding. Additionally unlike twisted fiber actuators, SMA and EAHS actuators contain an internal heating source, allowing for a completely integrated system.

Often actuators with high stresses have engineering limitations on their geometry which limit the total force than can generate. SMA actuators high conductivity necessitates their production into thin forms to increase the effective resistance. Without such limitations, the current requirements to get a sample to self-heat would be enormous. As a result SMA actuators are often used in flat sheets and thin cables. EAHS actuators have higher resistances and therefor can be heated with less current than SMA actuators. This allows the system to be produced in larger operable structures than SMA actuators and therefor generate more force. The limiting engineering principles of this material are not yet known, but it can already generate more force than comparable electrically driven material actuators.

Figure 10:
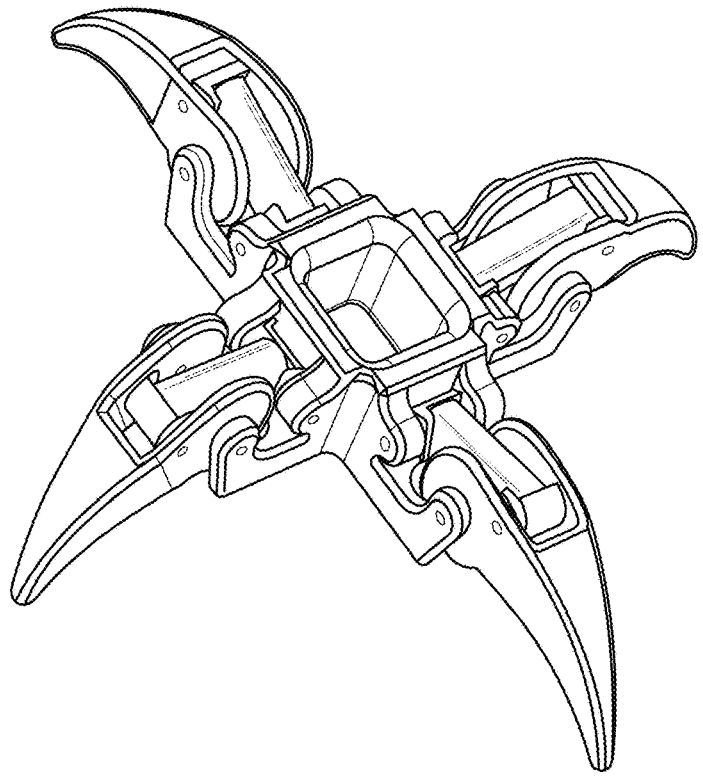
FIG. 10 illustrates a perspective view of a robot made with EAHS actuators according to an embodiment of the invention.
Figure 11:
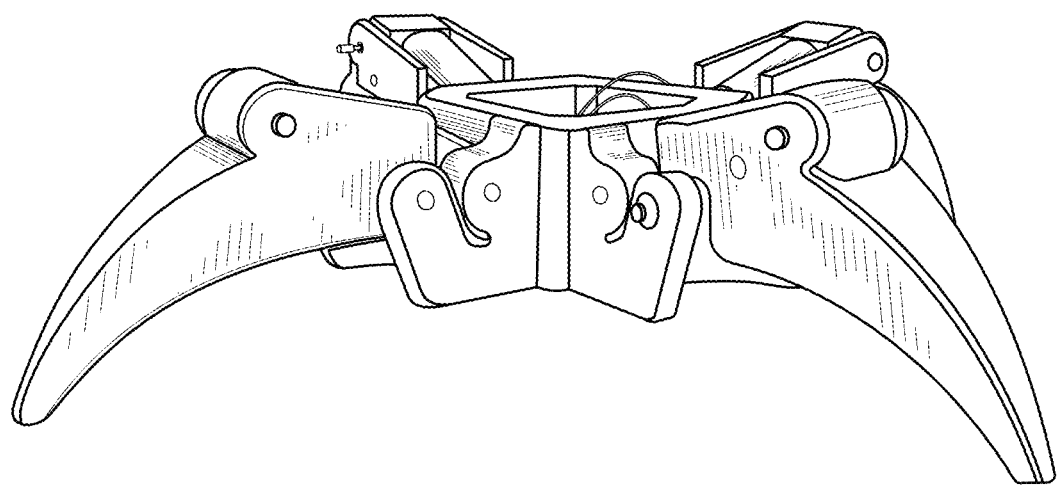
FIG. 11 illustrates a side view of the robot made with EAHS actuators according to an embodiment of the invention.
Figure 12:
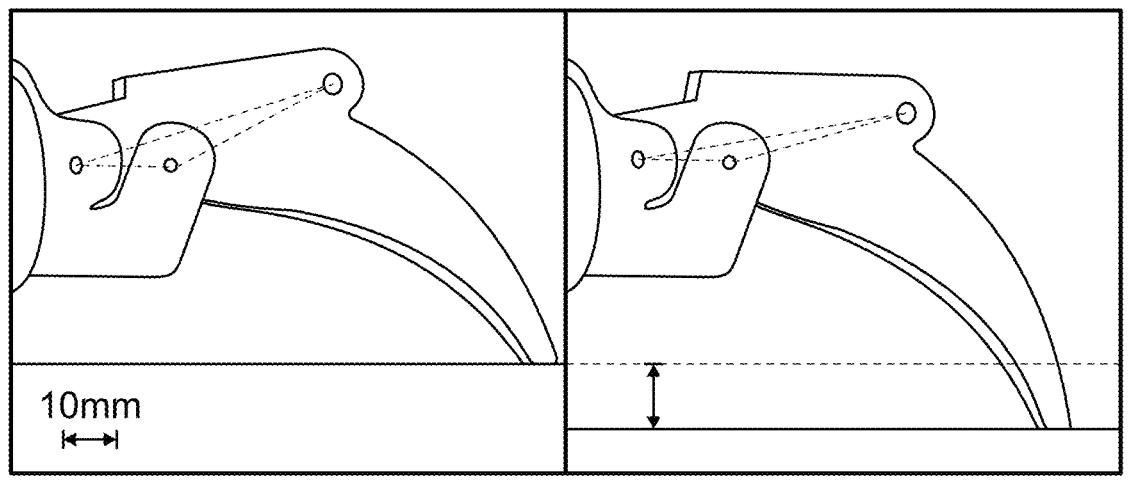
FIG. 12 illustrates an enlarged side view of a portion of the robot made with EAHS actuators according to an embodiment of the invention.

To probe the utility of the linear actuator, a small robotic system was built as shown in FIG. 10, FIG. 11 and FIG. 12. Each leg of the robot is powered by a single 14 mm diameter cylinder of the material. The center of the cylinder contained a copper wire for connection to power. The exterior of the casing was connected to ground. Activating the actuator caused it to expand from 50 mm to 52 mm. This small length changed was turned into a large angle change by allowing the actuator to pivot through the center of the leg. One end of the actuator was affixed 20 mm from the pivot of the leg. The other end was affixed 32 mm from the pivot point. This allowed the triangle formed from the three points to collapse to a line when the actuator expanded. This resulted in a rotation of 21 degrees. This motion allowed the robot to rise 38 mm, substantially more than the 2 mm length of expansion.

The robot was produced using a Stratasys Connex printer using Vero Grey material. The robot was assembled using metal pins for the joints. A separate 12V power supply actuator the muscles of the robot to expand. Using a 50 mm long muscle with a 20 mm diameter casing, the angle change from expanding the muscle between 50 and 52 mm is given by:

$$\cos^{-1}\left(\frac{-2304+x^2}{40x}\right) - \cos^{-1}\left(\frac{-2100+x^2}{40x}\right)$$

In one particular embodiment, the EAHS material is heated using 12 Volts. It is then cooled, and cut into two separate pieces. Each piece maintains an electrical contact. The voltage is then applied again and the system heats up and expands again. In another embodiment, a sample containing 30% wax is heated to 71 degrees Celsius inside a metal container with and open top. In another embodiment, a sample containing 20% wax is cooled from 71 degrees Celsius to room temperature inside a metal container with an open top. In yet another embodiment, a 30% wax concentration sample is reconstructed at room temperature.

FIG. 13 illustrates a table of various electroactive material actuators compared across important performance metrics. As shown in FIG. 13, EAHS can generate orders of magnitude more force than other electroactive materials. When compared with other electrically driven actuatable materials, EAHS generate these forces at lower voltages and for less mass. Several other actuators outperform EAHS on the strain metric, but those materials generate very small stresses. In the table, the top third of the performance range is colored medium gray, the middle third light gray, the lower third dark gray. It should be noted that typical force ratings are based upon standard applications of the technology.

High force EAHS materials offer new opportunities for the designers of soft machines, robotics and automation applications. Soft robotics often use pneumatics for driving pneunets, but rely on rigid mechanical valves for control. EAHS can potentially be used for valving of high pressure sources. Although the invention discusses a robot directed to linear actuation, it is contemplated that the ability of the material to expand volumetrically can be used to augment pressure in a fluid system. It can also be constrained to force it to generate a bending motion enabling deformable structures which are resistant to high loads.

Electrically actuated hydraulic solids are an exciting new class of electroactive polymer actuators. The high forces which can be generated open up new application spaces for Electroactive Polymer (EAP) actuators. The ability to replicate the complete systems of a traditional wax actuator is a new way to think about the design of material actuators. Rather than design a migration of charge, a chemical reaction, or a realignment of atomic structures, the bulk material replicates the functionality of different elements of a mechanical design using different functional sub materials. The result is a functional analog that is produced in a massively parallelized fashion. It is contemplated that the invention may be applied to other traditional mechanically manufactured actuators in the future to produce many other functionally memetic analogs to traditional actuators.

The described embodiments are to be considered in all respects only as illustrative and not restrictive, and the scope of the invention is not limited to the foregoing description. Those of skill in the art may recognize changes, substitutions, adaptations and other modifications that may nonetheless come within the scope of the invention and range of the invention.

The invention claimed is:

1. A linear actuator comprising:
   a casing; and
   an electrically actuated Hydraulic Solid (EAHS) material, borne within the casing, comprising a phase change material (PCM), an electrically conductive material, and an elastomeric polymer material, the PCM and the electrically conductive material being distributed within the elastomeric polymer material to form an electrically conductive elastomeric structure comprising a network of the electrically conductive material,
   wherein, upon application of a voltage to the electrically conductive elastomeric structure, a current through the network of the electrically conductive material heats the PCM to cause the PCM to expand from a first state to a second state and to cause the EAHS material to expand, and upon expansion of the EAHS material the linear actuator generates a linear motion.

2. The linear actuator of claim 1, wherein an exterior of the casing comprises at least one electrical connector.

3. The linear actuator of claim 1, wherein the EAHS material is metal free.

4. The linear actuator of claim 1, wherein the casing comprises a plurality of cells, each of the plurality of cells comprising a core of the EAHS material.

5. The linear actuator of claim 1, wherein a volume of the PCM in the EAHS material is between about 20-60% of a total volume of the EAHS material.

6. The linear actuator of claim 1, wherein the PCM comprises a wax, a paraffin wax, or a fatty acid.

7. The linear actuator of claim 1, wherein the elastomeric polymer material is formed from a single part elastomeric polymer composition or a two part elastomeric polymer composition.

8. The linear actuator of claim 7, wherein a first part of the two part elastomeric polymer composition comprises the PCM and a second part of the two part elastomeric polymer composition comprises the electrically conductive material.

9. The linear actuator of claim 1, wherein the electrically conductive material comprises powders, strips or fibers of carbon or metal.

10. A linear actuator, comprising:
    a casing;
    an electrically actuated hydraulic solid (EAHS), borne within the casing, comprising a phase change material (PCM), an elastomeric polymer material, and an electrically conductive material, the PCM and the electrically conductive material being distributed within the elastomeric polymer material to form an electrically conductive elastomeric structure including a network of electrically conductive material embedded in an elastomeric matrix;
    wherein the PCM material, upon application of a voltage to the electrically conductive elastomeric structure, causes the PCM to change phase and to expand from a first state at a first phase to a second state at a second phase to cause expansion of the EAHS material and linear movement of the linear actuator.

11. A robot comprising:
    a power supply; and
    at least one linear actuator comprising a casing bearing an electrically actuated Hydraulic Solid (EAHS) material, the EAHS material comprising a phase change material (PCM), an electrically conductive material, and an elastomeric polymer material, the PCM and the electrically conductive material being distributed within the elastomeric polymer material to form an electrically conductive elastomeric structure comprising a network of the electrically conductive material;
    wherein, upon application of a voltage to the electrically conductive elastomeric structure from the power supply, a current through the network of the electrically conductive material heats the PCM to cause the PCM to expand from a first state to a second state and to cause the EAHS material to expand such that the linear actuator generates a linear motion.

12. The robot of claim 11, wherein the at least one linear actuator is connected, directly or indirectly, to a movable element of the so robot, and wherein actuation of the at least one linear actuator causes the movable element of the robot to move from a first position to a second position.

13. The robot of claim 12, wherein the movement of the movable element of the robot comprises a rotation of the movable element about an axis of rotation or comprises a linear movement of the movable element.

14. The robot of claim 12, wherein the at least one linear actuator comprises a plurality of linear actuators.

* * * * *